(12) United States Patent
Okayama

(10) Patent No.: US 6,591,036 B2
(45) Date of Patent: Jul. 8, 2003

(54) OPTICAL MULTIPLEXING/DEMULTIPLEXING DEVICE

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 101 days.

(21) Appl. No.: 09/810,160

(22) Filed: Mar. 19, 2001

(65) Prior Publication Data

US 2002/0044724 A1 Apr. 18, 2002

(30) Foreign Application Priority Data

Oct. 13, 2000 (JP) ........................................ 2000/313419

(51) Int. Cl.[7] ............................. G02B 6/24; G02B 6/10
(52) U.S. Cl. ........................................ 385/24; 385/129
(58) Field of Search ................................ 385/129–132, 385/24

(56) References Cited

U.S. PATENT DOCUMENTS

| | | | | |
|---|---|---|---|---|
| 4,938,553 A | * | 7/1990 | Maerz et al. ................. | 385/14 |
| 5,061,032 A | | 10/1991 | Meltz et al. .................. | 385/37 |
| 6,016,375 A | * | 1/2000 | Hill et al. .................... | 385/129 |
| 6,049,640 A | | 4/2000 | Doerr ........................... | 385/15 |

OTHER PUBLICATIONS

C. K. Madsen et al., "Planar Waveguide Grating Optical Spectrum Analyzer", IMG4–1/99—IMG4–3/101.

* cited by examiner

Primary Examiner—David V. Bruce
Assistant Examiner—Krystyna Suchecki
(74) Attorney, Agent, or Firm—Wenderoth, Lind & Ponack, L.L.P.

(57) ABSTRACT

An optical multiplexing/demultiplexing device has a structure wherein a curved waveguide for input, linear waveguides for output, and a planar waveguide are provided within a substrate. The curved waveguide is discontinuous, and the curved waveguide and planar waveguide are separated from each other with an equal interval interposed therebetween. A light signal that is input to the curved waveguide is reflected by discontinuous surfaces of the curved waveguide. Afterwards, the respective reflected light signals are distributed to corresponding linear waveguides through the planar waveguide for every wavelength and focused thereon. Further, the light signals of the respective wavelengths, which are input into the linear waveguides, are multiplexed by and focused on the discontinuous portions of the curved waveguide.

5 Claims, 8 Drawing Sheets

OPTICAL MULTIPLEXING/DEMULTIPLEXING DEVICE

BACKGROUND OF THE INVENTION

1. Field of the Invention

The present invention relates to an optical waveguide element or device for separating or demultiplexing a wavelength-multiplexed input light signal for every wavelength and outputting the same therefrom. The present invention relates particularly to an optical multiplexing/demultiplexing device having a waveguide formed within a planar waveguide.

2. Description of the Related Art

In the field of optical communications, a wavelength division multiplexing (WDM) system has been developed which brings a plurality of signals into a signal form that is set as different lights and transmits them via an optical fiber. The present system needs to multiplex or demultiplex the lights that are different in wavelength for their input/output. Various types of elements or devices such as an array waveguide grating device, a device using a grating, etc. have heretofore been known as such types of optical branching or demultiplexing devices. FIGS. 1 and 2 show examples of optical demultiplexing devices each using a grating.

The device shown in FIG. 1 has a structure in which a linear optical waveguide 2 is provided on a substrate 1 and a linear chirp grating 3 is formed thereon. A planar waveguide 4 is provided side by side with the linear optical waveguide 2. The planar waveguide 4 takes a configuration in which optical waveguides 5 to output lights are connected thereto at its boundary surface. Light incident from one end of the linear optical waveguide 2 is reflected by the grating 3 and input to the planar waveguide 4 through the linear optical waveguide 2.

The cycle of the grating becomes small as it proceeds to its end. Thus, the light propagates so as to converge on the boundary portion of the planar waveguide 4 as shown in FIG. 1. Light-gathering points differ from one another for every wavelength, depending on the state of the interference of light, which is in turn dependent on the wavelengths at this boundary. The provision of the optical waveguides 5 at the boundary makes it possible to output the lights for every wavelength. A method of avoiding the use of such a special grating as seen in the structure of FIG. 1 has also been proposed as shown in FIG. 2.

In the structure of FIG. 2, an input waveguide 12 and a curved waveguide 13, laid out in an arc form other than the linear waveguide, is provided with equidistant gratings on a substrate 11. Further, a planar waveguide 14 having a shape extending along the curved waveguide 13 is provided, and output waveguides 15 are placed in a central position of a circular arc of the curved waveguide 13. The gratings are set diagonally to the center of the waveguide in such a manner that lights reflected by the gratings converge on the center of the circular arc. If the structure of FIG. 2 is adopted, then the lights can be focused on one point even if equidistant gratings are provided.

However, the conventional structure has a drawback in that the optimum focal position is substantially one point, i.e., an output value decreases in the case where each wavelength deviates from the focal point. A problem arises in that the acquisition of a certain degree of output by wavelengths which deviate from the optimum focal position results in the need to reduce a change in the focal position with respect to the distance extending from each grating to the focal point, thus leading to an increase in the overall length of the device.

SUMMARY OF THE INVENTION

The present invention aims to replace a conventionally used grating with a reflecting surface producible according to a waveguide producing process having a structure comprising a curved waveguide for input, output waveguides and a planar waveguide that are each provided within a substrate. The curved waveguide for input is discontinuous, and the curved waveguide and planar waveguide are spaced away from each other with an equal interval interposed therebetween.

Further, a light signal is reflected by each of the individual, discontinuous surfaces and is wavelength-demultiplexed through the substrate and planar waveguide. The demultiplexed lights are respectively focused on the output waveguides every wavelength. As a result, a structure can be formed which includes an optimum waveguide shape and reflecting surfaces, and hence a device that has improved controllability can be formed.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE INVENTION

Preferred embodiments of the present invention will hereinafter be described in detail with reference to the accompanying drawings.

Figure 1:
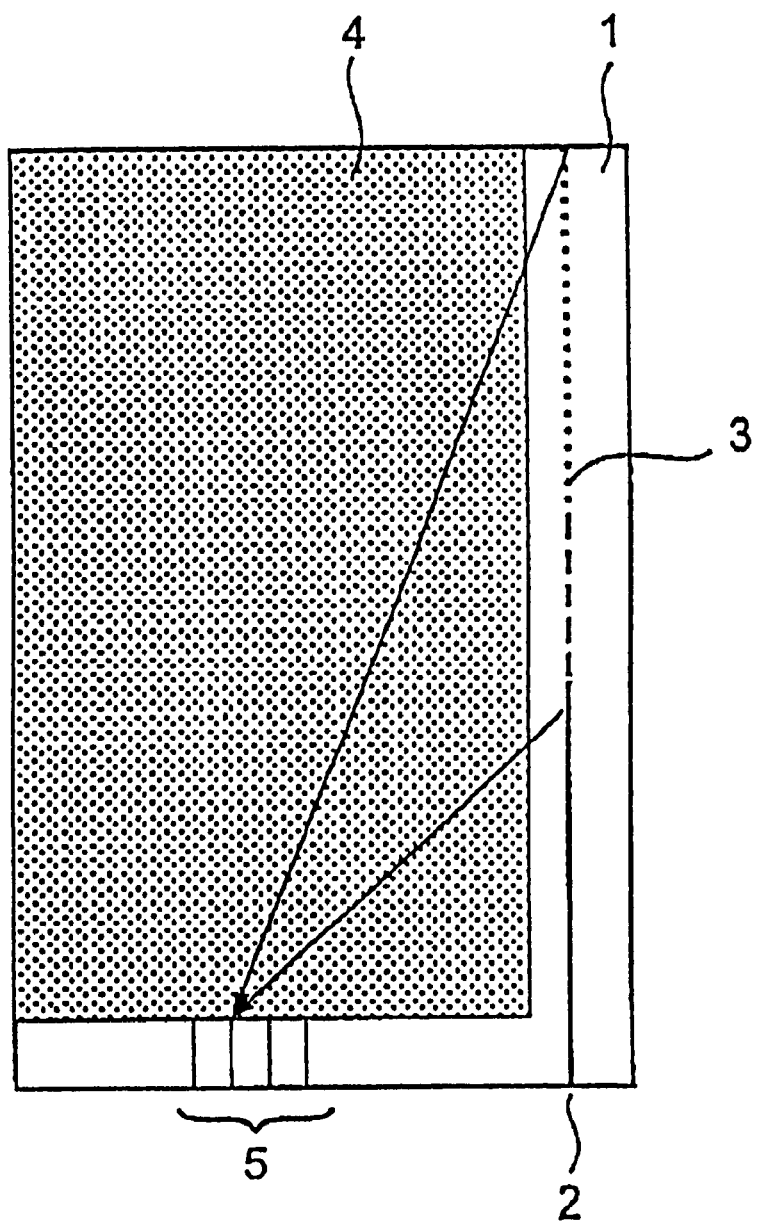
FIG. 1 is a plan view describing an optical demultiplexing device having a linear grating structure, according to the prior art.
Figure 2:
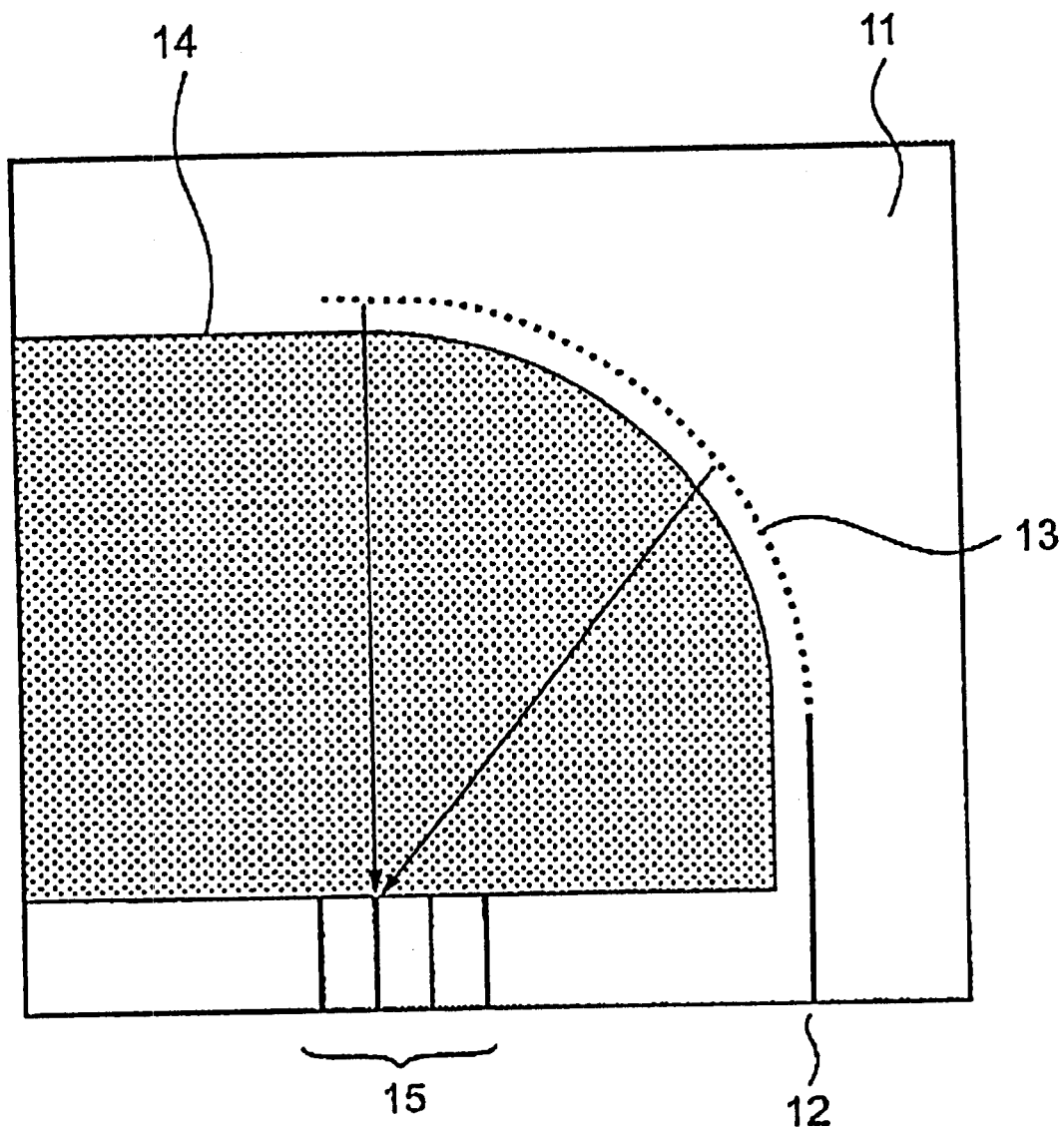
FIG. 2 is a plan view describing an optical demultiplexing device having a circular grating structure according to the prior art.
Figure 3:
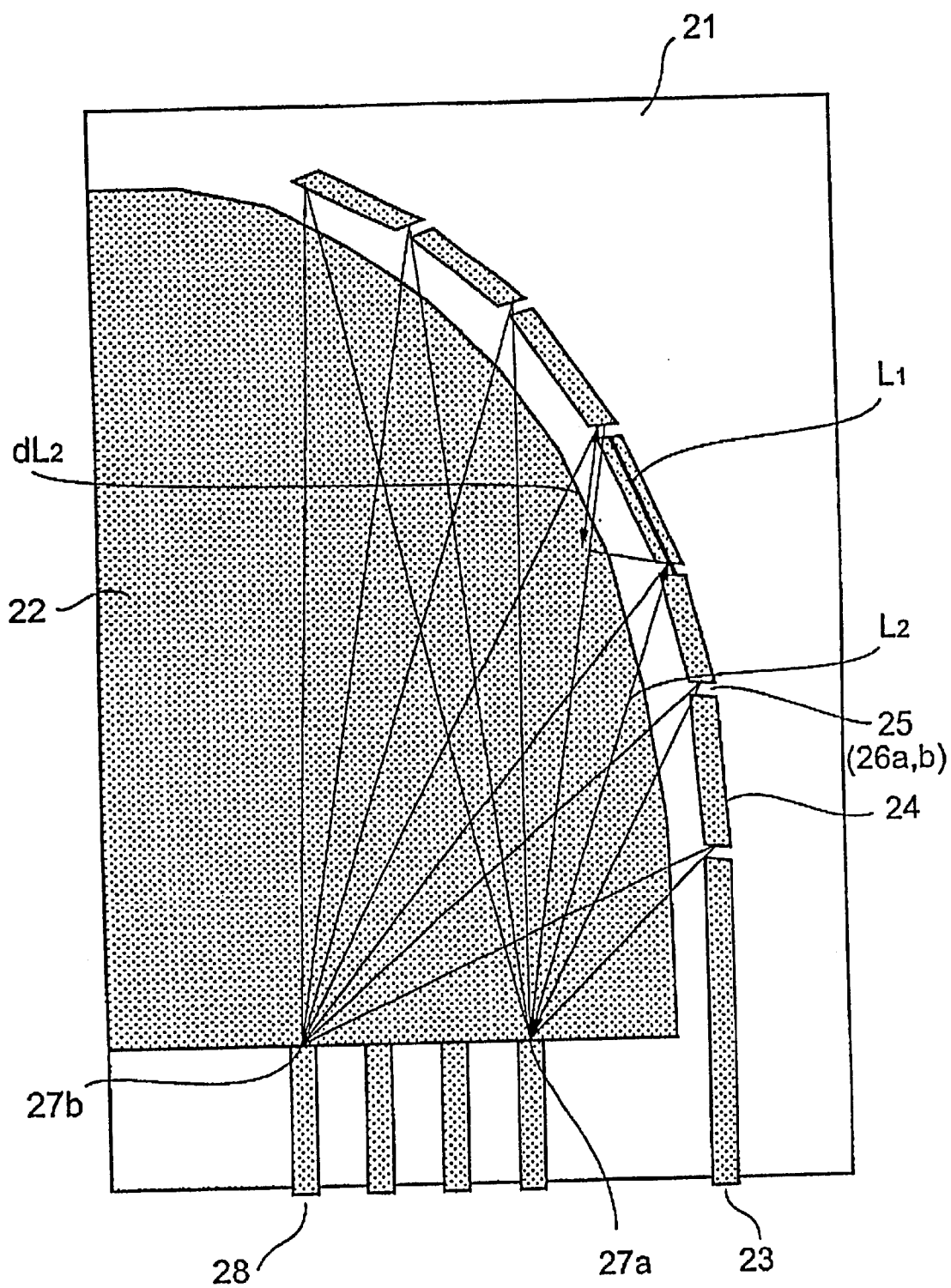
FIG. 3 is a plan view of an optical multiplexing/demultiplexing device describing a first embodiment of the present invention.

FIG. 3 is a plan view for describing a first embodiment. In FIG. 3, reference numeral 21 indicates a substrate, reference numeral 22 indicates a planar optical waveguide, reference numeral 23 indicates an input waveguide, and reference numeral 24 indicates a curved waveguide, which has a structure operable to trap or block up light with each portion being as high in equivalent refractive index as the substrate 21 and thereby allowing it to propagate light through the curved waveguide. Discontinuous portions 25 are equivalent to the discontinuous structures defined in the curved waveguide 24 and are for reflecting light propagated in the curved waveguide 24. Reference numeral 28 indicates output waveguides. The planar optical waveguide 22 is formed so as to be spaced away from the input waveguide 23 with an equal interval defined therebetween. On the other hand, a planar waveguide is provided over the whole surface of the substrate and an input waveguide may be formed therein.

A waveguide structure having an opening defined in a light-focused position 27 (which includes 27a and/or 27b) guides light to each output waveguide 28. Each of the discontinuous portions 25 has the function of reflecting light by both boundary surfaces 26a and 26b. The number of the reflecting surfaces can also be set according to their structures. The reflecting surface 26a has the function of reflecting the reflected light in the direction of the output waveguide 28. The reflecting surface is formed by an etching technique or the like.

In the present invention, lights reflected by a number of reflecting surfaces are set so as to produce the maximum outputs at the two most-suitable focal centers 27a and 27b, for example. If the distance between the boundary surfaces 26a and 26b is cut short to some extent, it is then also possible to increase an output of light having a wavelength brought into focus at a position therebetween.

Figure 4:
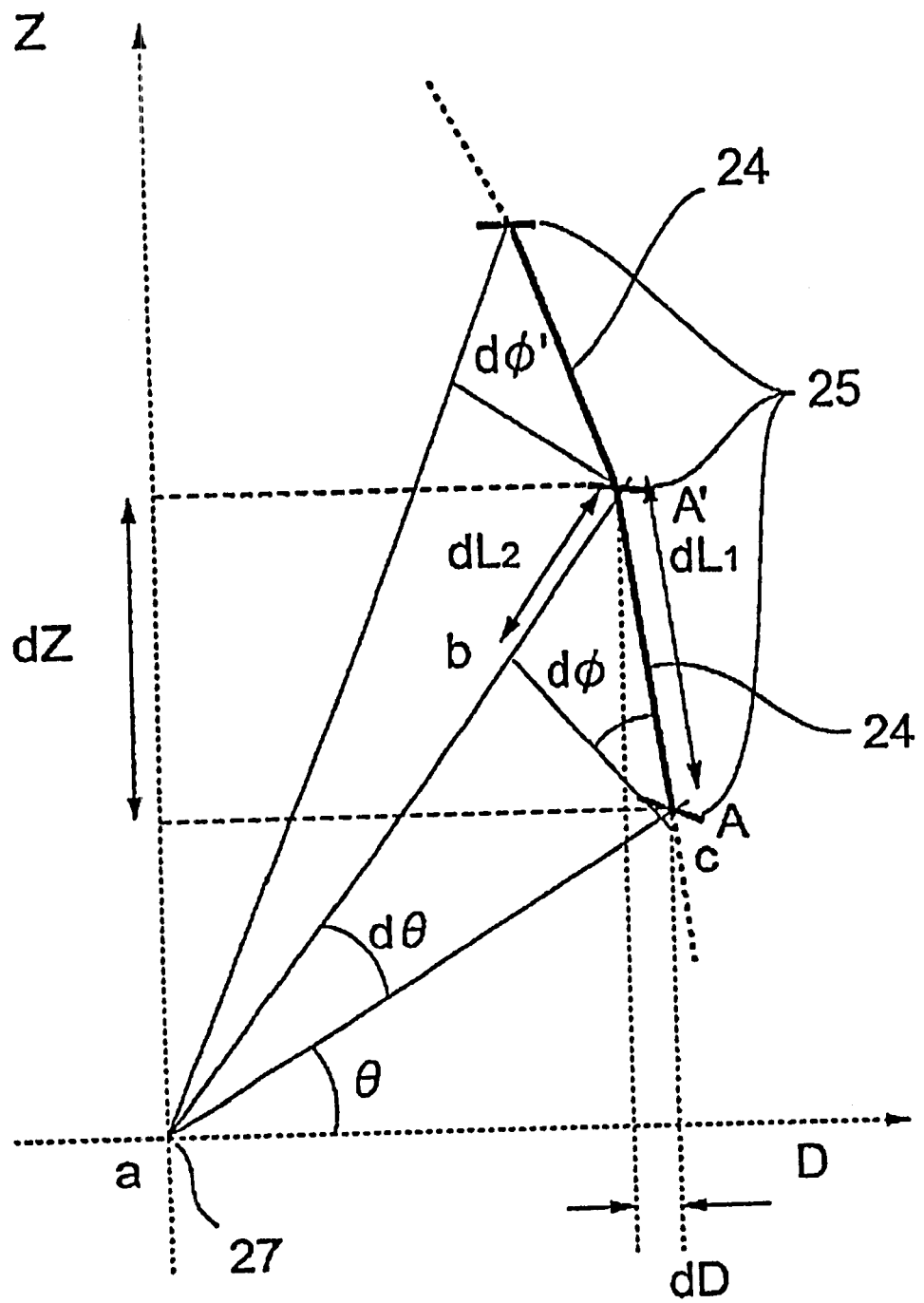
FIG. 4 is a coordinate system describing the first embodiment of the present invention.

FIG. 4 shows a curve structure of a block-in waveguide for each curved waveguide 24. The curved waveguide 24 is separated into small intervals or sections each having a length of $dL_1$. Discontinuous portions 25 indicated as A and A' that correspond to reflecting surfaces are provided at both ends of $dL_1$. Lights from the reflecting surfaces are focused on an optimum focal center 27. A triangle aAA' has a side AA' of a curved waveguide 24 inclined to a side bc of an isosceles triangle abc. The side AA' is inclined only $d\Phi$ toward the side bc.

A small section of another curved waveguide 24' is connected subsequent to the small section of one curved waveguide 24. A triangle formed by the small section and the optimum focal center 27 similarly has a structure in which the side of the curved waveguide 24 is inclined to form an isosceles triangle. This inclination $d\Phi'$ may vary for each small section.

The small sections are arranged in relation to one another in this way to thereby form the whole curve of the curved waveguides 24. When the side AA' of the curved waveguide 24 is made parallel (identical) to the side bc, i.e., $d\Phi=0$, the curve designated at numeral 24 results in a circular arc. Incidentally, the apex angles of the triangles aAA' and abc will be defined as $d\theta$. Assume that the angle of each of these triangles with respect to the horizontal axis is $\theta$ and the length of the side ac line thereof is $L_2$. Coordinates are represented as Z as viewed in a vertical direction and D as viewed in a horizontal direction.

When the difference in phase between lights from the discontinuous portions 25 at the respective reflecting surfaces is constant at the optimum focal center 27, lights emitted from an array waveguide to a planar waveguide by a conventional array waveguide diffraction grating element or device are gathered in the vicinity of the optimum focal center 27 for every wavelength by the same action as when the lights are caused to converge on many ends of the planar waveguide.

Light introduced from the input waveguide 23 is successively reflected by the reflecting surfaces A and A' and focused on the optimum focal center 27. A phase difference corresponding to the sum of a phase difference caused by a propagation distance $dL_1$ and a phase difference caused by a difference $dL_2$ in the propagation distance developed by the inclination of the side AA' is developed between the light reflected at A and the light reflected at A'. Since the reflecting surfaces A and A' are equallydistant from the optimum focal center 27 when the curved waveguide 24 is represented in the form of a circular arc, no difference $dL_2$ in the propagation distance occurs.

When the curved waveguide 24 is not given as the circular arc, it is necessary to contrive of a way of providing the curve of the curved waveguide 24 and the discontinuous portions 25 corresponding to the reflecting surfaces. When the output waveguide is provided in plural form, the phases must satisfy specific conditions with respect to a plurality of different optimum focal centers 27 in a single curved waveguide 24. Since $dL_1$ is fixed, no problem occurs, whereas when the optimum focal center 27 is shifted, $dL_2$ varies.

It is necessary to keep changes in phase, due to the shifting of the optimum focal centers 27 in the respective small areas of the curved waveguide 24, constant. Since chirping occurs in the difference in phase between the discontinuous portions 25 corresponding to the respective reflecting surfaces when this condition is not met, an optical field distribution will diminish at each light-gathering point. This will bring about an increase in loss and an increase in crosstalk in terms of performance.

Figure 5:
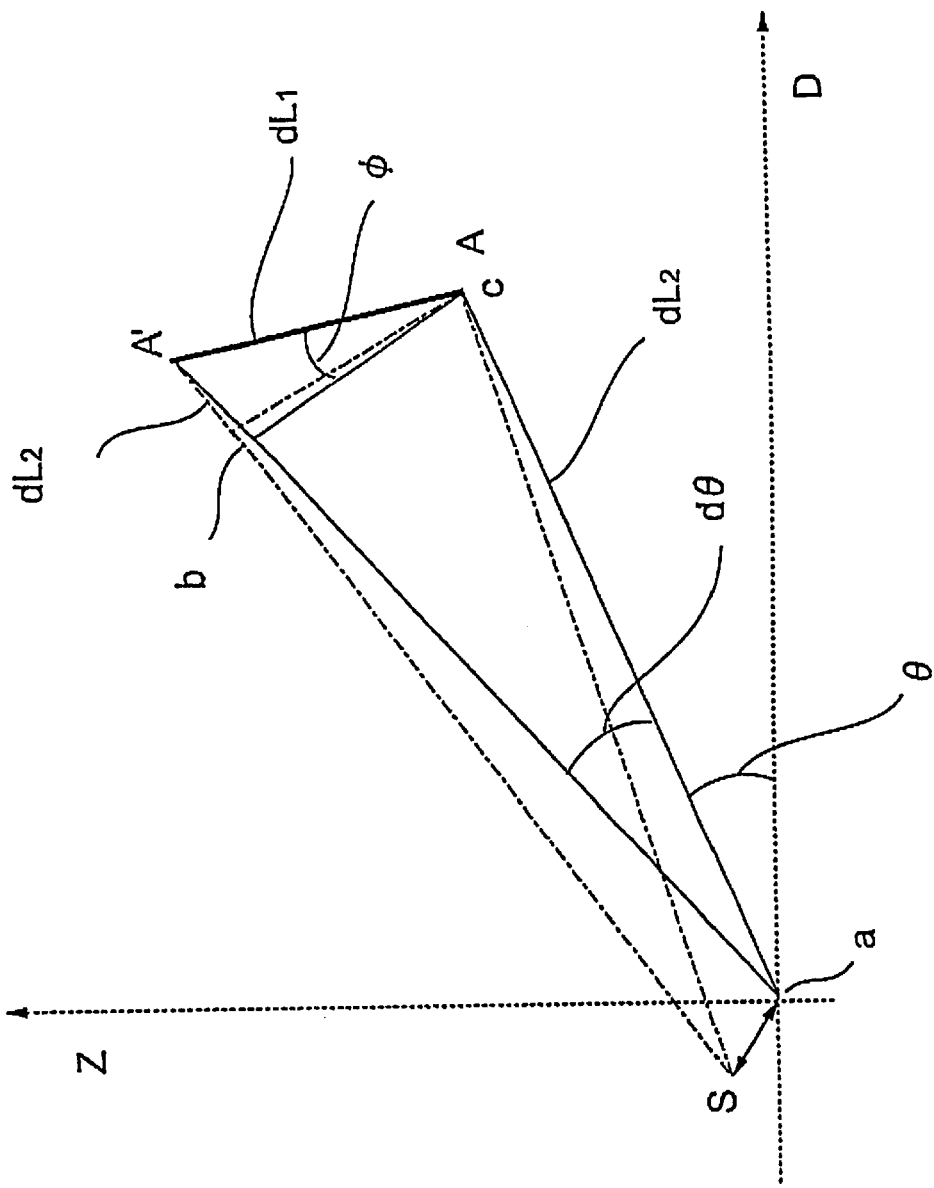
FIG. 5 is an enlarged view of the coordinate system describing the first embodiment of the present invention.

Next, a phase error is analyzed with reference to FIG. 5 to produce or derive a curved structure of a curved waveguide 24. The shifting of an optimum focal center 27 is associated with an angle $d\Phi$ that is changed by an angle $\delta$ in FIG. 5. The following relation is derived from FIG. 5 between $dL_1$, $L_2$, $d\theta$ and $d\Phi$.

$$\sin(d\theta/2)=dL_1 \cos(d\Phi)/(2L_2+dL_2) \tag{1}$$

Using an equation obtained from a cosine theorem in place of the expression also yields the same result.

The following relation is established between $dL_2$ and $dL_1$.

$$dL_2=dL_1 \sin(d\Phi)/\cos(d\theta/2) \tag{2}$$

Next, $dL=n_w dL_1+n_s dL_2$ needs to be identical over all the small sections so that no phase chirping is developed at each optimum focal position. Now, $n_w$ and $n_s$ respectively indicate the equivalent refractive indexes of the curved waveguide 24 and the planar waveguide 22.

From the above, the following relations are obtained:

$$dL_1=dL/[n_w+n_s \sin(d\Phi)/\cos(d\theta/2)] \tag{3a}$$

$$dL_2=dL/[n_s+n_w \cos(d\theta/2)/\sin(d\Phi)] \tag{3b}$$

An approximate calculation to the expression (1) is carried out. When $dL_1$ is very short and $dL_1/L_2<<1$, $d\theta$ is obtained as $d\theta<<1$.

Further, $\sin(d\theta/2)$ is rewritten in the following manner using the expression (3):

$$\sin(d\theta/2)=\cos(d\Phi)/[2L_2/dL](n_w+n_s \sin(d\Phi))+\sin(d\Phi)] \tag{4}$$

$d\Phi$ can be set at random. Operating characteristics of the device can be set according to a change in a small section number.

dL₁ remains unchanged even in the case of the shifting of the optimum focal center 27, and the difference $dL_2$ between the distance extending from A and A' to 27 contributes to a change in phase difference. A change $\delta dL_2$ in $dL_2$ when the focal position is changed by S, is derived from the expression (2) as follows:

$$\delta dL_2 = dL_1[\sin(d\Phi + S/L_2) - \sin(d\Phi)]/\cos(d\theta 2) = dL_2[\cos(S/L_2) - 1] + \sin(S/L_2)(2L_2 + dL_2)\tan(d\theta/2) \quad (5)$$

$\delta dL_2$ is 0 at the optimum focal position of S=0 and no phase chirping is developed. Thus, the device produces an output at the maximum power. When S is not equal to 0, a phase error given by the expression (5) is normally developed and the output power is reduced. However, $\delta dL_2$ can be set to a constant $\delta dL_{2c}$ with respect to a certain value of S without depending on a small section.

When $dL_1$ and $\tan(d\theta/2) \approx \sin(d\theta/2)$ are represented as an expression of $\Phi$ from the expressions (3) and (4) under the above conditions, and a change in $\Phi$ at each small section number is determined, a device structure can be obtained in which $\delta dL_2$ is constant at S (focal position $S_c$) with respect to its change. Eventually, no phase error occurs at the two positions of S=0 and SC, and a device can be obtained which produces the maximum output.

An expression for obtaining $d\Phi$ is represented as follows:

$$\{[\delta dL_{2c} - dL\cos(S_c/L_2) + dL] + \sin^2(S_c/L_2)dL_2\}\sin^2(d\Phi) + 2\delta dL_{2c}[\delta dL_{2c} - dL\cos(S_c/L_2) + dL]\sin(d\Phi) + \delta dL_{2c}^2 - \sin^2(S_c/L_2)dL^2 = 0 \quad (6)$$

Waveguide patterns are designed as follows. D and Z coordinates are given to a start position of a waveguide having reflecting surfaces. Thereafter, an initial value $\theta = \mathrm{atan}(Z/D)$ of an angle $\theta$ and $L_2$ are determined from the coordinates. Further, $d\Phi$ is provided to determine a start angle of the waveguide. $d\Phi$ is set to $\theta$ ($d\Phi = \theta$) to start the waveguide perpendicularly to a chip end surface.

Afterwards, $\theta$ of the next section is determined from $d\theta$ and $\theta + d\theta$ that is determined from the expression (4). Coordinates D and Z at an end of a small section are determined from $D - dL_1\sin(\theta - d\Phi + d\theta/2)$ and $Z + dL_1\cos(\theta - d\Phi + d\theta/2)$. As a result, the new $L_2$ of the next small section is obtained. Thereafter, a new $d\theta$ determined from the expression (4) using $d\Phi$ that is determined from the expression (6), whereby the end coordinates D and Z of the new small section are obtained.

A design method for providing a third optimum focal point is difficult because the degree of freedom of a structure is insufficient ($d\Phi$ and $L_2$ are determined uniquely as is understood from the expression (6), and $L_2$ needs to be different from each of every one of the small sections except when $d\Phi = 0$, thus causing a contradiction). Only the provision of conditions under which the second and third output characteristics are identical to each other is allowed and hence the maximum output cannot be obtained.

The analysis of design conditions will be explained below. $S_{ca,b}$ indicates two optimum focal points other than 0. If $L_{2c}$ is an initial value of $L_2$, then $$\delta dL_{2ca,b} = dL_1[\cos(S_{ca,b}/L_{2c}) 1] + \sin(S_{ca,b}/L_{2c})(2L_{2c} + dL_{2c})\tan(d\theta/2) \quad (7a)$$

$$dL_2 = [-\delta dL_{2cb}\sin(S_{ca}/L_2) + \delta dL_{2ca}\sin(S_{cb}/L_2)]/\{\sin(S_{cb}/L_2 - S_{ca}/L_2) - [\sin(S_{cb}/L_2) - \sin(S_{ca}/L_2)]\} \quad (7b)$$

As the waveguide becomes an arc structure, an output value increases. However, the arc structure is poor in wavelength resolution as shown below.

A method of series-connecting the structures of the input waveguides 23 having a plurality of different optimum focal points, as viewed in the direction in which light propagates through the input waveguide 23, and dispersing the optimum focal points can be used for the placement of the output waveguides 28 at their corresponding optimum focal points. The output value is reduced in principle. However, when a shift in S is substantially equal to or smaller than $S_c$, a prominent reduction in output value does not appear in terms of practical use.

Alternatively, structures having optimum focal points different from one another may overlap. In other words, they are structures wherein a pair of input waveguides 23 with regard to respective wavelengths are connected in parallel in plural form. The connection thereof in plural form allows an improvement in output strength.

A dispersion indicative of the speed at which the focal point moves according to the wavelength is given approximately from $\lambda \Delta S/\Delta \lambda = [n_w/n_s + \sin(d\Phi)]L_{2a}/\cos(d\Phi)$. In the expression, $L_{2a}$ indicates the mean value of $L_2$. As $d\Phi$ becomes close to the right angle (close to a straight line), the dispersion of the focal points increases. It is understood from the result of the simulation that the dispersion thereof becomes great as S decreases.

Figure 6:
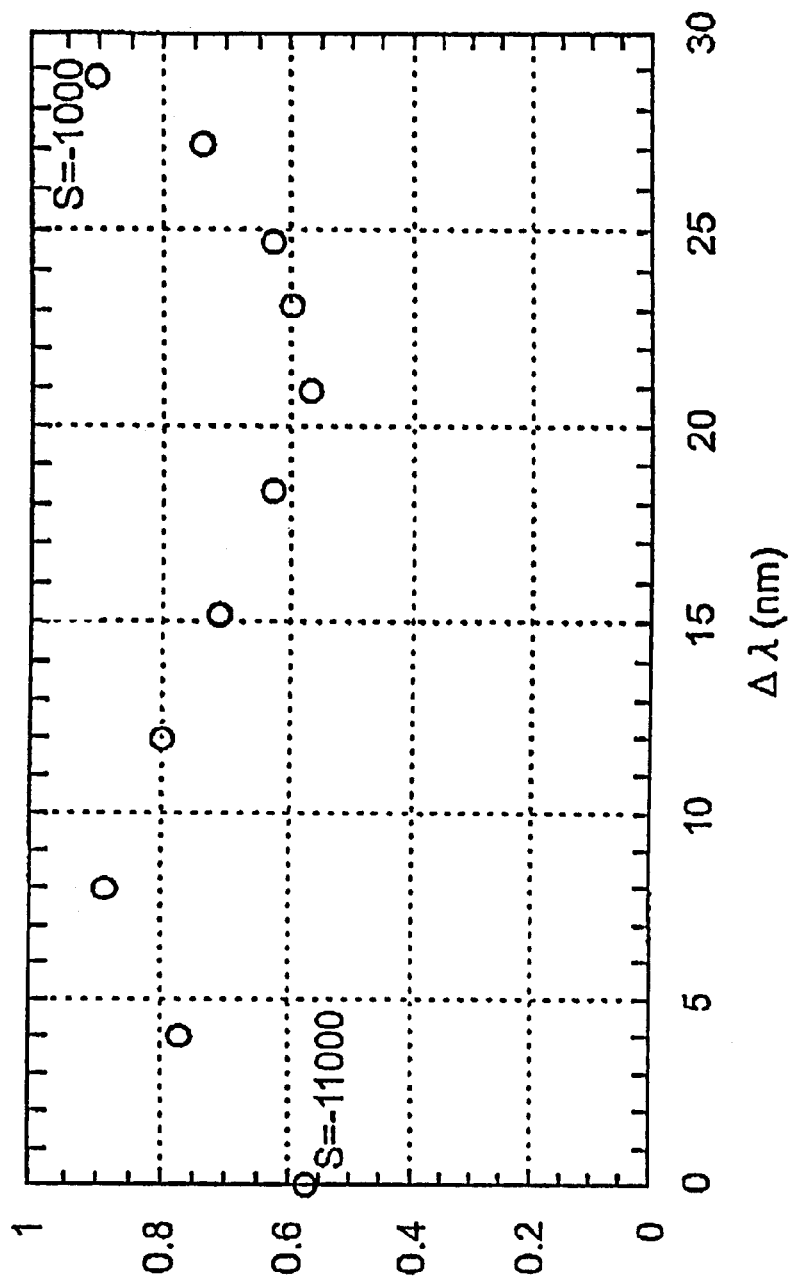
FIG. 6 is a simulation result of output strengths of the optical demultiplexing device of the first embodiment of the present invention.
Figure 7:
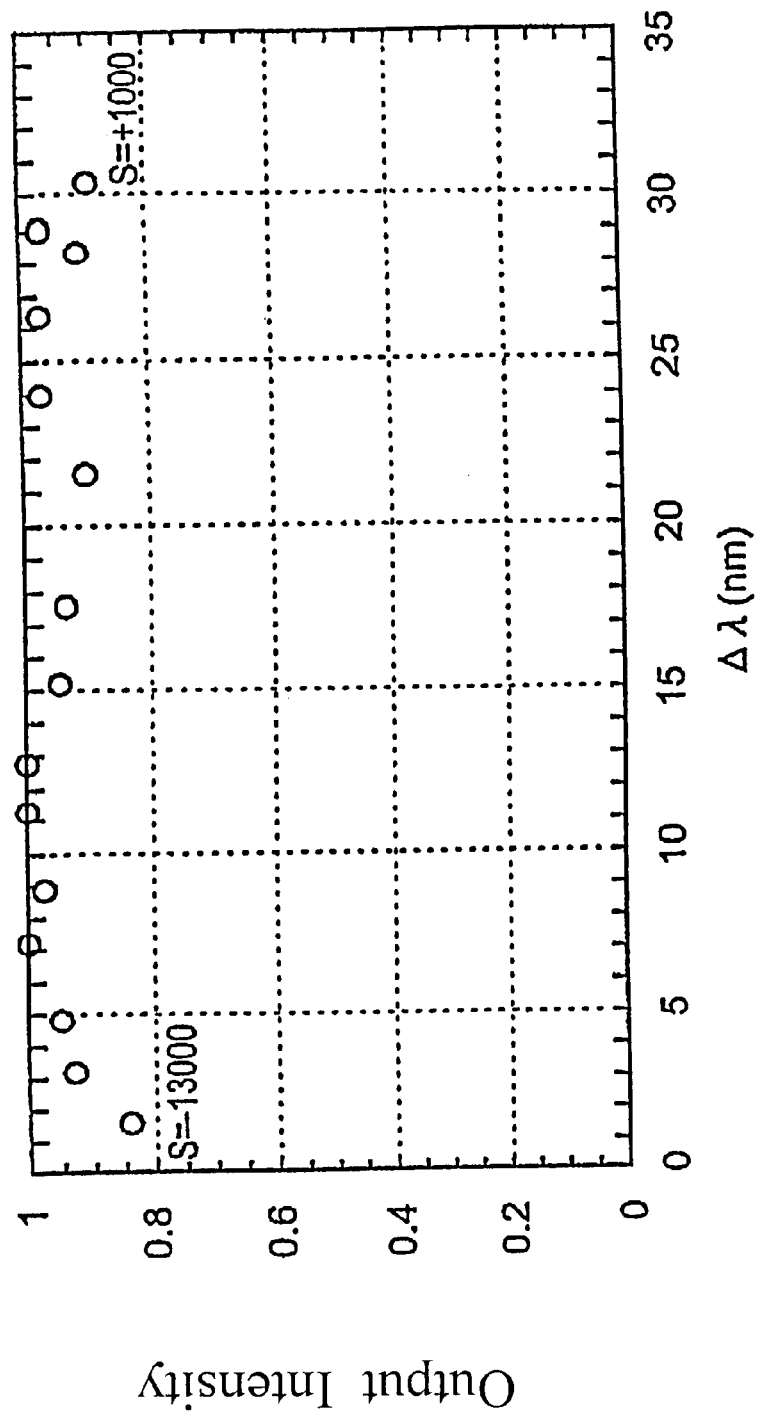
FIG. 7 is a further simulation result of output strengths of the optical demultiplexing device of the first embodiment of the present invention.

FIGS. 6 and 7 show respective examples of operating characteristics at a 1.551 μm band according to the first embodiment. In the examples, five times the wavelength, 2000, and π/2.1 were respectively used as dL, the number of reflecting surfaces of curved waveguides 24, and an initial value of θ. An example of a serial arrangement wherein two waveguides, in which an initial value of Z is 50000 μm, Sc is −6 mm and Sc is shifted −6 mm against the first waveguide, are combined into one, was used in FIG. 6. An example of a serial arrangement wherein two waveguides, in which an initial value of Z is 40000 μm, Sc is −3 mm and Sc is shifted −2 mm against the first waveguide, was used in FIG. 7.

Shifting a structure designed under similar parameters and having only one optimum focal position from the optimum wavelength by 5 nm results in a half reduction in output value. It is understood however that a high output is produced within a range of 30 nm with the structure employed in the first embodiment. In the case of a 1.55 μm-band wavelength employed in optical communications, a device with a small characteristic change between output waveguides over the range of 30 nm can be implemented with an overall length of about 6 cm.

Figure 8:
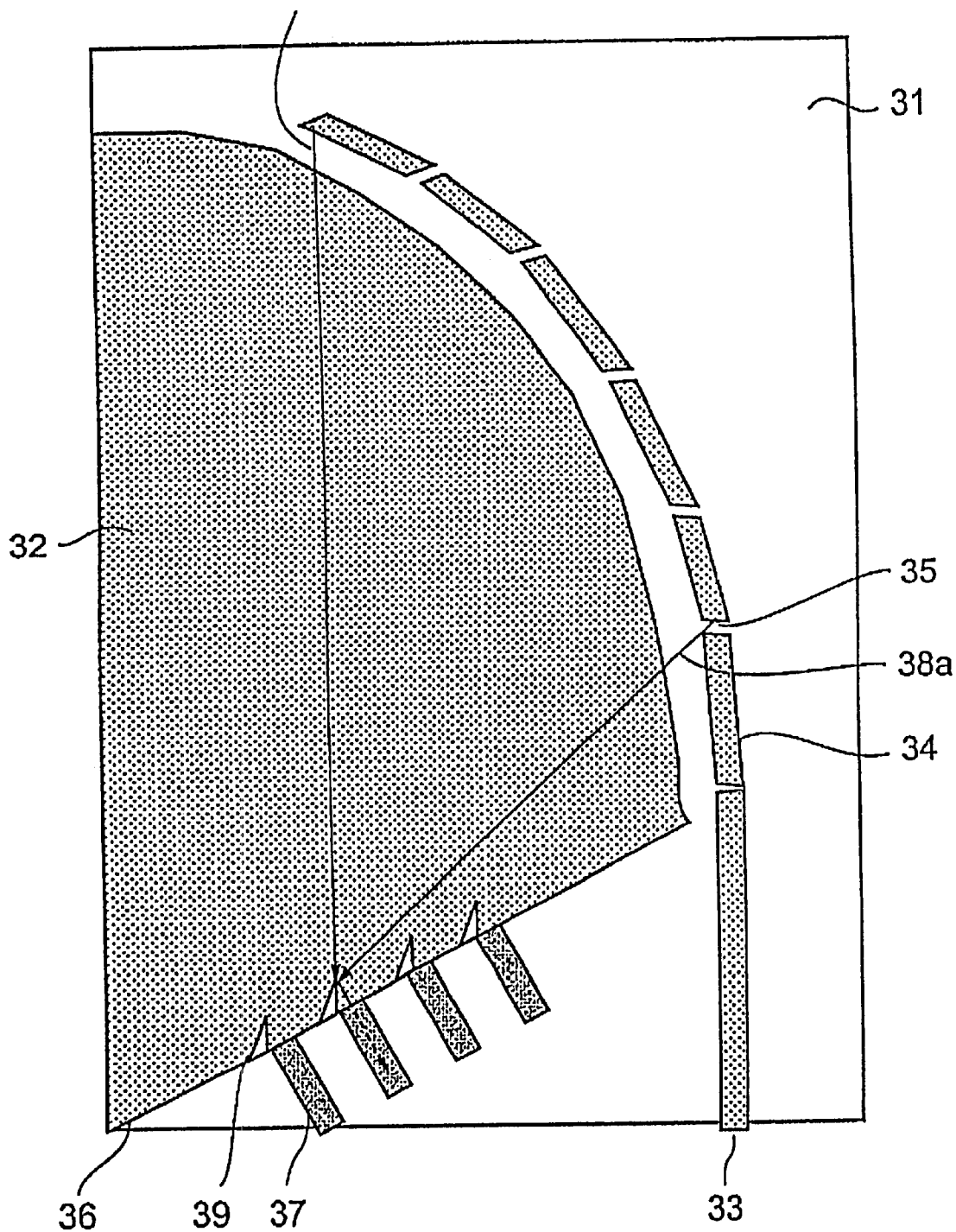
FIG. 8 is a plan view of an optical multiplexing/demultiplexing device describing the second embodiment of the present invention.

FIG. 8 shows a second embodiment of the present invention. In the present embodiment, a planar waveguide 32 and a connecting surface 36 of an output waveguide are designed so as to be inclined toward each output waveguide 37. Since $L_{2a}$ is small at a small portion of S that is large in dispersion in the present structure, dispersions set for every waveguide can be made uniform. Further, since output values can be outputted according to narrower changes in S position with the same output-waveguide pitches, they can easily be made uniformize.

In FIG. 8, a light-detecting element is used to function as the output waveguide 37. Mirrors 39 each used as an optical-path changing means are provided to allow lights 38a and 38b that are reflected from discontinuous portions 35 corresponding to reflecting surfaces to well converge on their corresponding output waveguide 37. Respective side faces of the openings defined by etching are used as the mirrors 39.

As described above, an optical multiplexing/demultiplexing device can be implemented in a simple manufacturing process, and has a structure having optimum waveguide configurations and reflecting surfaces as well as being good in controllability.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments that fall within the true scope of the invention.

What is claimed is:

1. An optical multiplexing/demultiplexing device comprising:
    a substrate;
    a first curved waveguide formed within said substrate, said first curved waveguide being partly separated by discontinuous portions, said first curved waveguide having reflecting surfaces at said discontinuous portions;
    a second set of waveguides; and
    a planar waveguide formed within said substrate and connected to said second set of waveguides, said planar waveguide being separated from said first curved waveguide by an equal interval between said planar waveguide and said first curved waveguide;
    wherein said first curved waveguide is structured and arranged such that if a light signal is input to said first curved waveguide, the light signal is reflected by said reflecting surfaces and demultiplexed and focused on said second set of waveguides through said planar waveguide for every wavelength of the light signal, and such that if light signals are input to said second set of waveguides, the light signals are respectively focused on said reflecting surfaces through said planar waveguide and muliplexed by said first curved waveguide.

2. The optical multiplexing/demultiplexing device according to claim 1, wherein the shape of said first curved waveguide is non-circular.

3. The optical multiplexing/demultiplexing device according to claim 1, wherein said second set of waveguides is directly connected to said planar waveguide.

4. The optical multiplexing/demultiplexing device according to claim 1, wherein said second set of waveguides comprises a plurality of waveguides respectively receiving a plurality of wavelengths.

5. The optical multiplexing/demultiplexing device according to claim 1, wherein a surface for connecting each waveguide of said second set of waveguides and said planar waveguide is inclined toward said each waveguide of said second set of waveguides.

* * * * *